Sept. 27, 1966   J. H. SASSEEN ETAL   3,275,981
APPARATUS FOR CORRELATING DIP LOG TRACES
Filed Aug. 22, 1963                          3 Sheets-Sheet 1
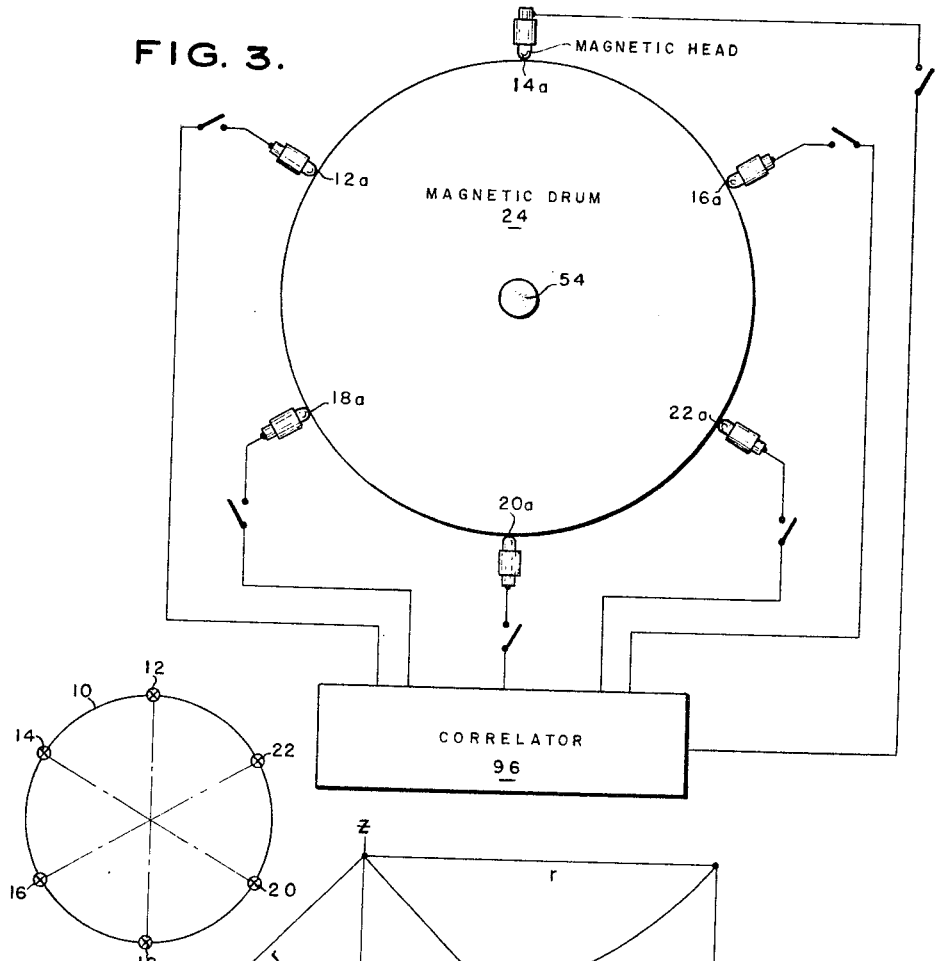
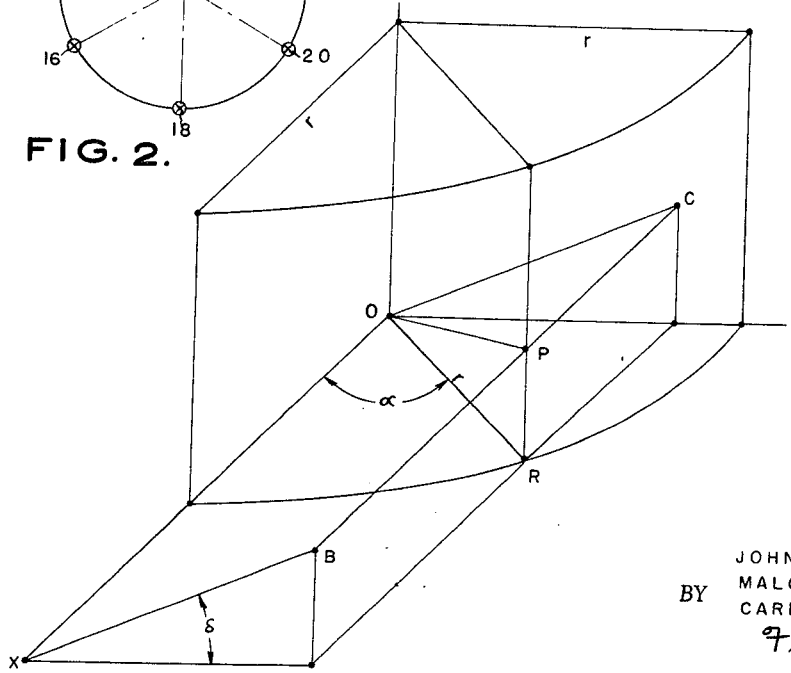
INVENTORS.
JOHN H. SASSEEN,
MALCOLM R. MacPHAIL,
CARL R. WISCHMEYER,
BY Frank S. Troidl
ATTORNEY.

Sept. 27, 1966 J. H. SASSEEN ETAL 3,275,981
APPARATUS FOR CORRELATING DIP LOG TRACES
Filed Aug. 22, 1963 3 Sheets-Sheet 2

INVENTORS.
JOHN H. SASSEEN,
MALCOLM R. MacPHAIL,
CARL R. WISCHMEYER,
BY Frank S. Troidl
ATTORNEY.

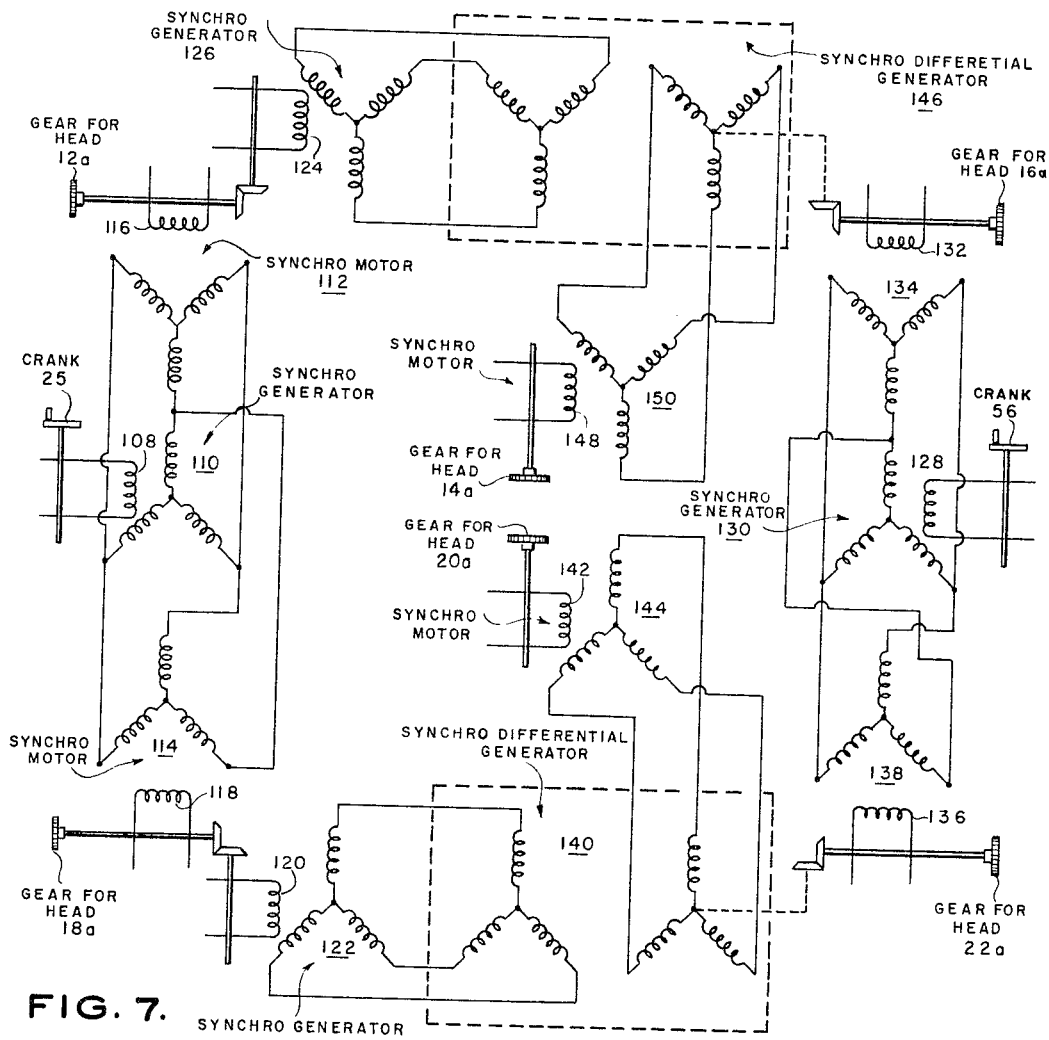

3,275,981
APPARATUS FOR CORRELATING DIP
LOG TRACES
John H. Sasseen, Malcolm R. MacPhail, and Carl R. Wischmeyer, Houston, Tex., assignors, by mesne assignments, to Esso Production Research Company, Houston, Tex., a corporation of Delaware
Filed Aug. 22, 1963, Ser. No. 303,746
1 Claim. (Cl. 340—15.5)

This invention relates to geophysical prospecting. More particularly, this invention is a method and apparatus for displacing a plurality of magnetic heads about a magnetic drum.

One method used in geophysical prospecting is called dipmeter logging. The conventional dipmeter includes three profile arms which are pressed against the sides of the borehole. Dipmeter logs are obtained by the dipmeter. The dipmeter logs are interpreted and the information obtained from these logs used to ascertain the dip angle from the horizontal of subsurface formations.

The electrical signals obtained from the dipmeter log contain a great deal of nonsignificant variations (noise). A basic problem is that of separating the significant information (message) from the noise. One method of separating the message from the noise of a dipmeter log is described in Patent No. 2,928,071 entitled, "Interpretation of Geophysical Data," by Feagin et al., issued March 8, 1960. The method described in Patent No. 2,928,071 may be called a correlation method.

In recent years, the number of dipmeter arms in commercially available dipmeter tools has been increased to more than the conventional three arms. With a greater number of dipmeter arms, more points around the borehole can be determined, thereby resulting in more accurate determination of the dip from the horizontal of subsurface formations.

With the obtainment of dipmeter logs including more than three curves, a problem is presented of developing methods and apparatus for use in correlating not only the conventional three curve dipmeter logs but also dipmeter logs including more than three curves.

The invention to be described herein is a method and apparatus for displacing three, four, or six magnetic heads about a magnetic drum. The signals generated by the magnetic heads, which signals vary as the heads are displaced about the magnetic drum, may be fed to a correlation system.

Briefly described, the invention comprises a plurality of magnetic heads movably mounted about a magnetic drum. Means are provided for displacing three, four, or six magnetic heads from a reference. Each of the heads is moved in an appropriate direction an amount to provide for the proper movement of each head for efficient correlation of the dipmeter curves recorded on the magnetic drum.

The invention, as well as its many advantages, will be further understood by reference to the following detailed description and drawings in which:

FIG. 1 is a trigonometric explanation of the basis upon which the measuring heads are linked;

FIG. 2 is a plan view of a borehole showing the spacing between six dipmeter arms in a dipmeter logger;

FIG. 3 is a plan view, partly schematic and partly in block diagram, illustrating one embodiment of the invention;

FIG. 6 is an electrical, schematic diagram illustrating the manner of operating the electromagnetic brakes; and FIG. 7 is an electrical, schematic diagram of a second embodiment of the invention.

Figure 4:
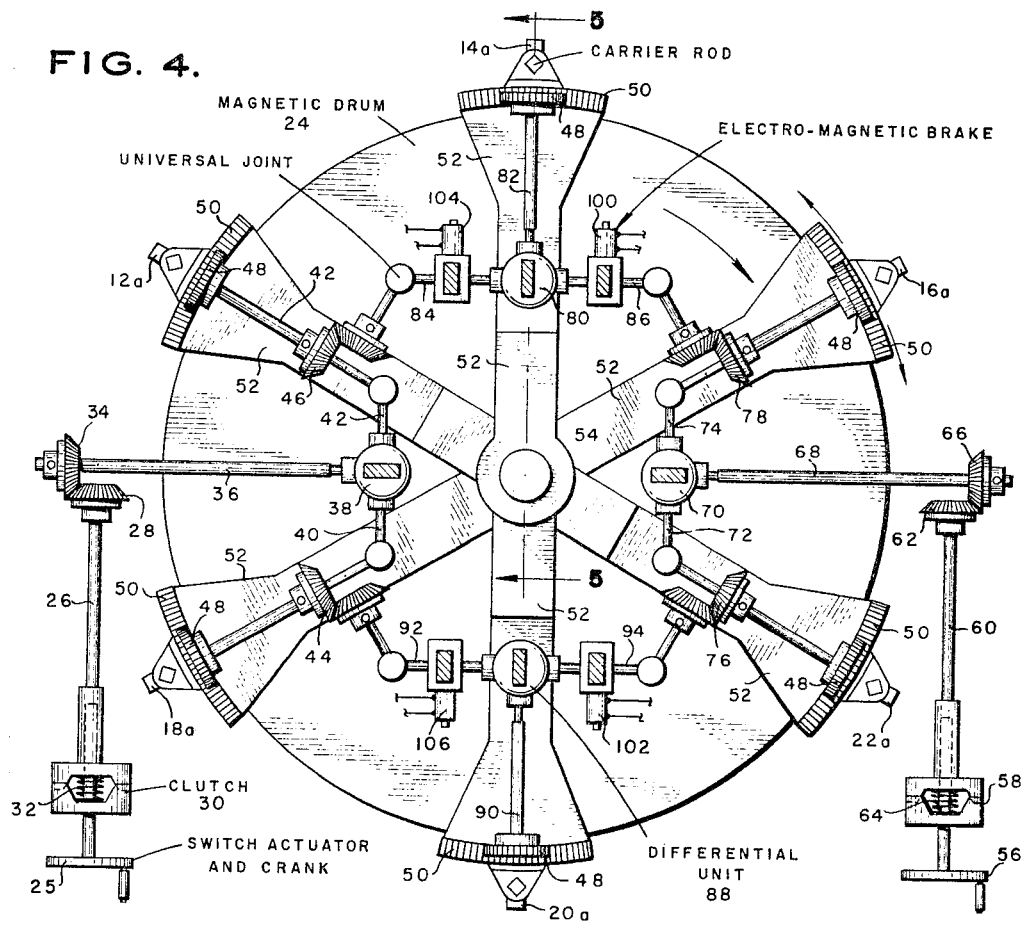
FIGS. 4 and 5 are views illustrating the mechanical means for mounting and displacing the various magnetic heads.

Referring to the drawings and more particularly to FIG. 1, let the dip plane be OXBC and the horizontal plane making an angle $\delta$ with the dip plane be OXY. The axis OX is the strike. Let the first arm of the dipmeter move on line PR. PR is the assumed vertical. Let the azimuth of OPR measured clockwise from OX be $\alpha$ as shown. The borehole radius is OR which is equal to $r$. The coordinates of R are then $r \cos \alpha$, $r \sin \alpha$, 0. Hence, the coordinates of point P on the dip planes are $r \cos \alpha$, $r \sin \alpha$, $r \tan \delta \sin \alpha$. Thus, the height of P above OXY is $\Delta_1 = r \tan \delta \sin \alpha$.

If the remaining five dipmeter arms are spaced at intervals of 60° in azimuth measured counterclockwise from the first arm, the heights of the corresponding points on the dip plane are:

$\Delta_2 = r \tan \delta \sin (\alpha + 60)$
$\Delta_3 = r \tan \delta \sin (\alpha + 120)$
$\Delta_4 = r \tan \delta \sin (\alpha + 180) = -\Delta_1$
$\Delta_5 = r \tan \delta \sin (\alpha + 240) = -\Delta_2$
$\Delta_6 = r \tan \delta \sin (\alpha + 300) = -\Delta_3$ By subtraction, $\Delta_2 - \Delta_3 = 2 r \tan \delta \sin \alpha \cos 60 = r \tan \delta \sin \alpha = \Delta_1$ or $\Delta_2 = \Delta_1 + \Delta_3$. That is, the displacements of the measuring heads are linked according to two sets of equations:

$\Delta_i = -\Delta_{i+3}$ for $i = 1, 2, 3, 4, 5, 6$; and
$\Delta_i = \Delta_{i+1} + \Delta_{i-1}$ for $i = 1, 2, 3, 4, 5, 6$.

The system to be described herein provides displacements of magnetic heads in accordance with the equations developed with reference to FIG. 1.

FIG. 2 illustrates the spacing of six arms of a dipmeter about a borehole 10. Arms 12, 14, 16, 18, 20, and 22 are arcuately spaced by 60° around the borehole 10.

The dip log curves taken at the plurality of spaced measuring points around the borehole may be initially recorded on the rotatable magnetic drum 24 (FIG. 3) or initially recorded on a different type of recording medium and then transcribed onto rotatable magnetic drum 24. The dip log curves are separated longitudinally along magnetic drum 24.

A plurality of magnetic heads, one magnetic head for each recorded dip log curve, is movably mounted about the magnetic drum 24. The magnetic heads are identified by reference numerals 12a, 14a, 16a, 18a, 20a, and 22a. Magnetic heads 12a, 14a, 16a, 18a, 20a, and 22a are used to produce electrical signals corresponding to the dip log curves taken at points 12, 14, 16, 18, 20, and 22, respectively, of FIG. 2.

Figure 5:
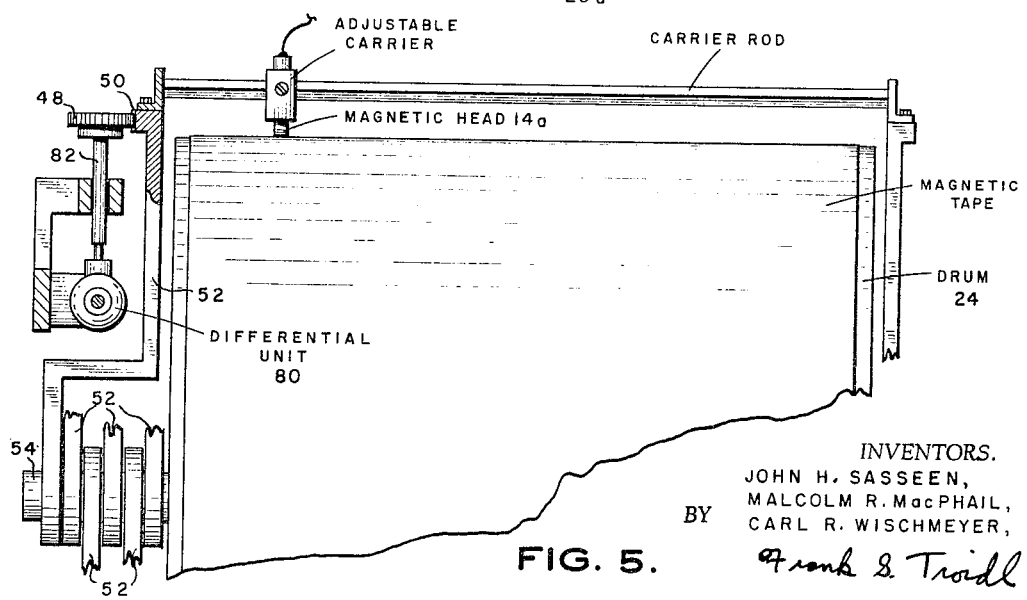

A rotatable crank 25 for rotating crank shaft 26 is included in the embodiment of FIG. 4 and FIG. 5. A gear 28 is mounted upon the crank shaft 26. A clutch 30 is engaged to cause rotation of crank shaft 26 when the crank 25 is moved upwardly against the bias of coil spring 32.

The gear 28 of crank shaft 26 engages gear 34 connected to one end of shaft 36. The shaft 36 leads to a differential gear mechanism 38. A first shaft 40 and a second shaft 42 having mounted thereon gear 44 and gear 46, respectively, extend outwardly from the differential gear mechanism 38.

The differential gear mechanism 38 is constructed to rotate shafts 40 and 42 in opposite directions by equal amounts. The rotations of shaft 40 and shaft 42 are changed from rotary movements to translational movements by means such as a rack and pinion arrangement. Such a rack and pinion arrangement may take the form of those shown in FIGS. 4 and 5. Referring to FIGS. 4 and 5, a pinion gear 48 is connected to shaft 42. The pinion gear 48 meshes with curved rack 50 connected to the arm 52 of the magnetic head 12a. Arm 52 is also pivotally connected to the axis 54 of the rotatable magnetic drum 24. Similar means for changing rotary movements into translational movements of the magnetic heads are used for each of the other magnetic heads.

The rotation of crank 25 causes rotation of shaft 40 and displacement of magnetic head 18a along drum 24. Similarly, the rotation of crank 25 causes rotation of shaft 42 in a direction opposite to the rotation of shaft 40 and displacement of magnetic head 12a along drum 24 in a direction opposite to the displacement of magnetic head 18a and by the same amount.

A second rotatable crank system including crank 56, clutch 58, crank shaft 60, and gear 62 is included in the apparatus. Rotation of crank 56 against the bias of spring 64 causes the engagement of clutch 58. The rotation of crank 56 causes displacements of magnetic head 16a and magnetic head 22a in opposite directions by equal amounts through gear 66 connected to shaft 68. The shaft 68 is connected to differential gear mechanism 70. Shaft 72 and shaft 74 having mounted thereon gear 76 and gear 78, respectively, lead from differential gear mechanism 70.

A differential gear mechanism generator 80 is also mounted on the magnetic drum 24. The differential gear mechanism generator 80 is constructed to rotate shaft 82 an amount equal to the sum of the rotations of shafts 84 and 86. Thus, the displacement of magnetic head 14a along magnetic drum 24 is proportional to the sum of the rotations of shafts 84 and 86.

A second differential gear mechanism generator 88 provides rotation of shaft 90 which is equal to the sum of the rotations of shafts 92 and 94. Hence, the displacement of magnetic head 20a along magnetic drum 24 is proportional to the sum of the rotations of shafts 92 and 94.

An electrical line including a switch is provided for each of the magnetic heads. The electrical lines lead to the correlator 96 (FIG. 3).

In carrying out our new method with our new apparatus, the crank 25 is rotated when it is desired to correlate the dipmeter logs recorded on magnetic drum 24. The rotation of crank 25 causes the closing of microswitch 98 (FIG. 6). The closing of microswitch 98 causes the actuation of electromagnetic brakes 100 and 102 on shafts 86 and 94, respectively. Thus, shafts 86 and 94 are locked.

The rotation of crank 25 causes the movements of magnetic heads 12a and 18a by equal amounts in opposite directions and also causes magnetic heads 14a and 20a to be moved in their proper relation to heads 12a and 18a by means of the coupling through the differential gear generators 80 and 88.

Thereafter, crank 25 is released causing the opening of microswitch 98 thereby unlocking electromagnetic brakes 100 and 102. Crank 56 is then rotated to lock the electromagnetic brakes 104 and 106 on shafts 84 and 92, respectively. The electrical system for locking electromagnetic brakes 104 and 106 is constructed the same as that shown in FIG. 6 for locking electromagnetic brakes 100 and 102.

The rotation of crank 56 causes displacements of magnetic heads 16a and 22a in equal amounts and opposite directions along drum 24 and also causes magnetic heads 14a and 20a to be moved in their proper relations to magnetic heads 16a and 22a by means of the coupling through differential gear mechanism generator 88.

Cranks 25 and 56 are alternately rotated until the proper displacements of all the magnetic heads are obtained to accurately determine the dip of a particular subsurface formation as indicated by the correlator 96 in the manner described in the aforementioned U.S. Patent 2,928,071. Correlator 96 may be similar to the correlator system disclosed in the aforementioned Patent No. 2,928,071, issued March 8, 1960, to Feagin et al. entitled, "Interpretation of Geophysical Data."

Our new invention has versatility in that any number of types of dip logs can be properly displaced by our system. For example, dipmeter logs obtained by dipmeter logging tools having three or four arms can be properly displaced by our method and system.

Four dip log curves which are obtained by arms spaced 90° in the borehole with the curves adjacent magnetic head 12a and magnetic head 18a being separated by 180° and with the curves adjacent magnetic heads 16a and 22a being separated by 180° can be correlated by electrically disconnecting the outputs of magnetic heads 14a and 20a.

The correlation of three dip log curves which are obtained by arms spaced 120° can be accomplished by electrically disconnecting the outputs of either magnetic heads 14a, 18a, and 22a or magnetic heads 12a, 16a, and 20a.

FIG. 7 shows a synchro system for accomplishing the proper displacements of all the magnetic heads. Referring specifically to FIG. 7, the rotation of crank 25 causes corresponding rotation of rotor coil 108 of synchro generator 110. The stator coils of synchro generator 110 are shown connected to the stator coils of synchro motor 112 and the stator coils of synchro motor 114 in a manner such that rotation of rotor coil 108 in synchro generator 110 will cause equal and opposite rotations of rotor coil 116 in synchro motor 112 and rotor coil 118 in synchro motor 114.

The rotation of rotor coil 118 in synchro motor 114 is mechanically transmitted to the rotor coil 120 in synchro generator 122; the rotation of rotor coil 116 in synchro motor 112 is mechanically transmitted to the rotor coil 124 in synchro generator 126.

Rotation of crank 56 causes an equal rotation of rotor coil 128 in synchro generator 130. This results in equal rotations in opposite directions of rotor coil 132 in synchro motor 134 and rotor coil 136 in synchro motor 138.

The Y-connected stator coils of synchro generator 122 are connected to the Y-connected stator coils of synchro differential generator 140. The rotation of rotor coil 136 of synchro motor 138 is mechanically transmitted to the Y-connected rotor coils of the synchro differential generator 140.

The synchro differential generator 140 is connected to synchro generator 122 and synchro motor 138 in a manner such that the rotation of the rotor coils in synchro differential generator 140 is equal to the sum of the rotations of rotor coil 120 in synchro generator 122 and rotor coil 136 in synchro motor 138. The rotation of the rotor coils of synchro differential generator 140 causes an equal rotation of rotor coil 142 in the synchro motor 144.

In a similar manner, the rotor coils in the synchro differential generator 146 are rotated an amount equal to the sum of the rotations of rotor coil 124 in synchro generator 126 and rotor coil 132 in synchro motor 134. The rotor coil 148 of synchro motor 150 is rotated the same amount as the rotor coils of synchro differential generator 146.

Though not shown in FIG. 7, it is to be understood that an electromagnetic braking system similar to that shown in FIG. 6 as well as the clutches 30 and 58 shown in FIG. 4 may be included as a part of the system shown in FIG. 7.

The operation of the system of FIG. 7 is similar to the operation of the system of FIG. 4. Rotation of crank 25 causes equal and opposite displacements of magnetic heads 12a and 18a as well as movements of magnetic heads 14a and 20a in the appropriate directions and amounts. Rotation of crank 56 causes equal and opposite displacements of magnetic heads 16a and 22a as well as movements of magnetic heads 14a and 20a in the appropriate directions and amounts.

The electrical leads and switches as well as the correlator shown in FIG. 3 may be used as a part of the system shown in FIG. 7 in order to permit the correlation of three, four, or six dip log curves.

We claim:

In combination with a magnetic drum adapted for the recording of a plurality of dip log curves taken at a plurality of equally spaced measuring points around a borehole: six magnetic heads movably mounted about the magnetic drum; and first means connected to said six magnetic heads for displacing four of the six magnetic heads along the magnetic drum, said first means being constructed and arranged to displace a first magnetic head and a second magnetic head by equal amounts in opposite directions, and to displace a third magnetic head and a fourth magnetic head by equal amounts in opposite directions, with the displacements of the first and third magnetic heads being in the same direction, and second means connected to said first means to displace the fifth magnetic head an amount equal to the sum of the displacements of the first and third magnetic heads, and to displace the sixth magnetic head an amount equal to the sum of the displacements of the second and fourth magnetic heads; said first means for displacing four of the six magnetic heads comprising a first rotatable member, a first synchro generator operated by the first rotatable member, a first synchro motor and a second synchro motor connected to said synchro generator and to the first and second magnetic heads, respectively, a second rotatable member, a second synchro generator operated by the second rotatable member, and a third synchro motor and a fourth synchro motor connected to said second synchro generator and to the third and fourth magnetic heads, respectively; said second means comprising means including a synchro differential generator and a synchro motor connecting the first and third heads to the fifth magnetic head, and means including a synchro differential generator and a synchro motor connecting the second and fourth magnetic heads to the sixth magnetic head.

References Cited by the Examiner
UNITED STATES PATENTS

| | | | |
|---|---|---|---|
| 2,938,195 | 5/1960 | Begun et al. | 340—15.5 |
| 2,998,592 | 8/1961 | Wells | 340—15.5 |
| 3,044,041 | 7/1962 | Salvatori et al. | 340—15.5 |
| 3,075,172 | 1/1963 | Loper et al. | 340—15.5 |
| 3,173,997 | 3/1965 | Bargetzi et al. | 179—100.2 |

BENJAMIN A. BORCHELT, *Primary Examiner.*

R. M. SKOLNIK, *Assistant Examiner.*